(12) United States Patent
Aerrabotu et al.

(10) Patent No.: US 7,406,333 B2
(45) Date of Patent: Jul. 29, 2008

(54) METHOD AND APPARATUS FOR OPERATING A BLOCKED SECURE STORAGE MEMORY

(75) Inventors: Naveen Aerrabotu, Gumee, IL (US); Charles Philipp Binzel, Bristol, WI (US); Bharat Srinivasan, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 1110 days.

(21) Appl. No.: 10/295,978

(22) Filed: Nov. 15, 2002

(65) Prior Publication Data

US 2004/0097266 A1 May 20, 2004

(51) Int. Cl.
*H04B 1/38* (2006.01)
*H04M 1/00* (2006.01)

(52) U.S. Cl. .................. 455/558; 455/410; 455/411; 455/414.1; 455/418; 455/419; 455/420; 455/423; 455/425; 455/517; 235/380; 235/382; 235/382.5

(58) Field of Classification Search .................. 455/558, 455/410, 411, 517, 414.1, 418–420, 423, 455/425; 235/380, 382, 382.5
See application file for complete search history.

(56) References Cited

U.S. PATENT DOCUMENTS

| 5,883,786 | A | * | 3/1999 | Nixon ........................ 455/558 |
| 5,907,804 | A | * | 5/1999 | Schroderus et al. ......... 455/411 |
| 6,052,604 | A | * | 4/2000 | Bishop, Jr. et al. .......... 455/558 |
| 6,360,092 | B1 | * | 3/2002 | Carrara ....................... 455/558 |
| 6,600,916 | B1 | * | 7/2003 | Verstraete ................... 455/410 |
| 6,728,553 | B1 | * | 4/2004 | Lehmus et al. .............. 455/558 |
| 2002/0186845 | A1 | * | 12/2002 | Dutta et al. ................. 380/247 |
| 2003/0120957 | A1 | * | 6/2003 | Pathiyal ...................... 713/202 |
| 2004/0092248 | A1 | * | 5/2004 | Kelkar et al. ................ 455/411 |
| 2004/0097266 | A1 | * | 5/2004 | Aerrabotu et al. ........... 455/558 |

FOREIGN PATENT DOCUMENTS

EP 0 703 676 * 3/1996

OTHER PUBLICATIONS

"Digital cellular telecommunications system (Phase 2+); Specification of the Subscriber Identity Module-Mobile Equipment (SIM -ME) interface (GSM 11.11 version 8.2.0 Release 1999)", European Telecommunications Standards Institute Technical Specification 100 977 V8.2.0 (May 2000), 167 pages.

* cited by examiner

*Primary Examiner*—Stephen M D'Agosta
(74) *Attorney, Agent, or Firm*—Randall S. Vaas; Gary J. Cunningham

(57) ABSTRACT

The invention provides an apparatus and method for service access for a mobile communication device. The apparatus can include an identity module for storing user information in the mobile communication device. The identity module can include an identity module frame, a secure storage memory coupled to the frame, the secure storage memory including a mobile communication device subscriber identity and the user information, and an identity module controller coupled to the secure storage memory and the frame, the identity module controller configured to block access to the user information and grant access to the mobile communication device subscriber identity when the identity module enters a blocked mode. The identity module controller may grant access to the mobile communication device subscriber identity in response to a request for a service access communication.

8 Claims, 6 Drawing Sheets

METHOD AND APPARATUS FOR OPERATING A BLOCKED SECURE STORAGE MEMORY

CROSS-REFERENCE TO RELATED APPLICATIONS

This application is related to the application entitled "Method and Apparatus for Service Access for a Mobile Communication Device," Ser. No. 10/298,977, and the application entitled "Method and System for Processing a service Access Request for a Mobile Communication Device," Ser. No. 10/295,979, both filed on even date herewith and commonly assigned to the assignee of the present application.

BACKGROUND OF THE INVENTION

1. Field of Invention

The present invention is directed to a method and apparatus for operating a blocked secure storage memory. In particular, the present invention is directed to a method and apparatus for establishing a service access communication for a device having a blocked identity module.

2. Description of Related Art

Presently, secure storage memories such as identity modules are used in mobile communication devices. Such identity modules can include subscriber identity modules, removable user identity modules, or any other devices useful for storing information in a mobile communication device. An identity module can include information related to a user of the mobile communication device. Specifications for an example identity module are described in "Digital cellular telecommunications system (Phase 2+); Specification of the Subscriber Identity Module—Mobile Equipment (SIM—ME) interface (GSM 11.11 version 8.2.0 Release 1999)," which is hereby incorporated by reference.

In operation, an identity module may block access to information or functions of the identity module for security purposes. For example, the identity module may require an access code, such as a personal identification number or card holder verification information, to grant access rights to data and functions of the identity module. If the access code is incorrectly entered three consecutive times, the identity module can enter a blocked mode. For example, the identity module may enter a blocked status of an access code. Thus, if the access code function is enabled and the status is blocked, a mobile communication device will determine such and end an access attempt. Therefore, in a blocked mode, the access attempt is finished unsuccessfully.

For security purposes, if the identity module is in a blocked mode, no data can be retrieved from the identity module and a mobile communication device using the identity module cannot be registered on a mobile communication system. Thus, when the identity module is in a blocked mode, the only communication allowed for the mobile communication device is for an emergency call, such as a 911 emergency call.

When the identity module is in a blocked mode, the only way to use the mobile communication device for other communications is to unblock the identity module. To unblock the identity module, a specific unblock code must be entered into the identity module. Such an unblock code can include an unblock card holder verification value, a personal identification number unblocking key, or other like code. This unblock code is obtained from a home service center. For example, a subscriber desiring to use a blocked mobile communication device must contact the home service center on which the identity module is subscribed. The home service center then obtains validation information from the subscriber to verify the subscriber is the proper owner of the identity module. Upon verification, the home service center can provide an unblock code to unblock the identity module.

Unfortunately, a subscriber may not be able to contact the home service center. In particular, because the mobile communication device cannot register on a network due to the identity module being blocked, the subscriber cannot use the mobile communication device to contact the home service center. This is especially problematic when the subscriber is in an area where the local mobile communication network is not the subscriber's home mobile communication network. For example, the subscriber may be in a foreign country where the subscriber cannot conveniently contact the subscriber's home service center. This creates the unfortunate situation where it is nearly impossible for the subscriber to obtain an unblock code. Thus, the subscriber is prevented from using the mobile communication device for an extended period of time.

Thus, there is a need for method and apparatus for establishing a service access communication for a device having a blocked secure storage memory such as a blocked identity module.

SUMMARY OF THE INVENTION

The invention provides an apparatus and method for service access for a mobile communication device. The apparatus can include an identity module for storing user information in the mobile communication device. The identity module can include an identity module frame, a secure storage memory coupled to the frame, the secure storage memory including a mobile communication device subscriber identity and the user information, and an identity module controller coupled to the secure storage memory and the frame, the identity module controller configured to block access to the user information and grant access to the mobile communication device subscriber identity when the identity module enters a blocked mode. The identity module controller may grant access to the mobile communication device subscriber identity in response to a request for a service access communication. The secure storage memory can further include a blocked mode indicator having a blocked mode status and an unblocked mode status. The identity module controller can be configured to grant access to the mobile communication device subscriber identity when the blocked mode indicator is in a blocked mode status to indicate the identity module is in a blocked mode.

The identity module controller can also be configured to switch the identity module to an unblocked mode upon receipt of an unblock code. The identity module frame can have a face with the mobile communication device subscriber identity displayed on the face. The mobile communication device subscriber identity can be an international mobile subscriber identity.

The identity module can include a program memory including identity module code. The identity module controller can execute the identity module code for operation of the identity module. The identity module can include input circuitry and output circuitry configured to communicate with a controller of a mobile communication device. The identity module can enter a blocked mode in response to a predetermined number of failed attempts to enter an access code.

According to another embodiment, the present invention provides a mobile communication device. The mobile communication device can include a transmitter a receiver, input and output circuitry, a mobile communication device controller coupled to the transmitter, the receiver, and the input and output circuitry, and a subscriber identity module coupled to the mobile communication device controller, the subscriber identity module having a blocked mode for blocking access to user information and an unblocked mode for allowing access to the user information. The subscriber identity module can include a secure storage memory including an international mobile subscriber identity data and the user information and a subscriber identity module controller coupled to the secure storage memory. The subscriber identity module controller can be configured to grant access to the user information and the international mobile subscriber identity data when the subscriber identity module enters an unblocked mode, and deny access to the user information when the subscriber identity module enters a blocked mode and grant access to the international mobile subscriber identity data when the subscriber identity module enters a blocked mode and when a request for a service access communication is made. The subscriber identity module controller can be further configured to switch the subscriber identity module to an unblocked mode upon receipt of an unblock code. The subscriber identity module can also enter a blocked mode in response to a predetermined number of failed attempts to enter an access code.

According to another embodiment, the present invention provides a method of operating an identity module in a mobile communication device. The method can include receiving an access request, determining a blocked mode of the identity module, denying the access request if the identity module is in a blocked mode and the request is for user information, and granting the request if the identity module is in a blocked mode and the request is for a subscriber identity. The granting step can include granting the request if the identity module is in a blocked mode and the request is for a subscriber identity for a service access communication. The method can also include placing a service access communication to a home service provider. The method can additionally include entering a blocked mode of the identity module, receiving a specific key sequence, determining the specific key sequence is for a service access communication. The granting step further can include granting the request if the identity module is in a blocked mode and the request is for a subscriber identity for a service access communication.

The method can further include receiving an incorrect access code, determining the number of incorrect access codes received since the last correct access code, entering a blocked mode of the identity module if the number of incorrect access codes since the last access code is more than a predetermined amount. The subscriber identity can be an international mobile subscriber identity. The method can also include receiving an unblocking code, and entering an unblocked mode of the identity module in response to the unblocking code. The method can additionally include transmitting a service access request on a random access channel.

Thus, among other benefits, the present invention allows a subscriber the ability to conveniently unblock an identity module regardless of the subscriber's location. The present invention also allows a subscriber the ability to make a service call despite an identity module or mobile communication device being in a blocked mode. These and further benefits will become more apparent with reference to the Figures and the descriptions of the preferred embodiments.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
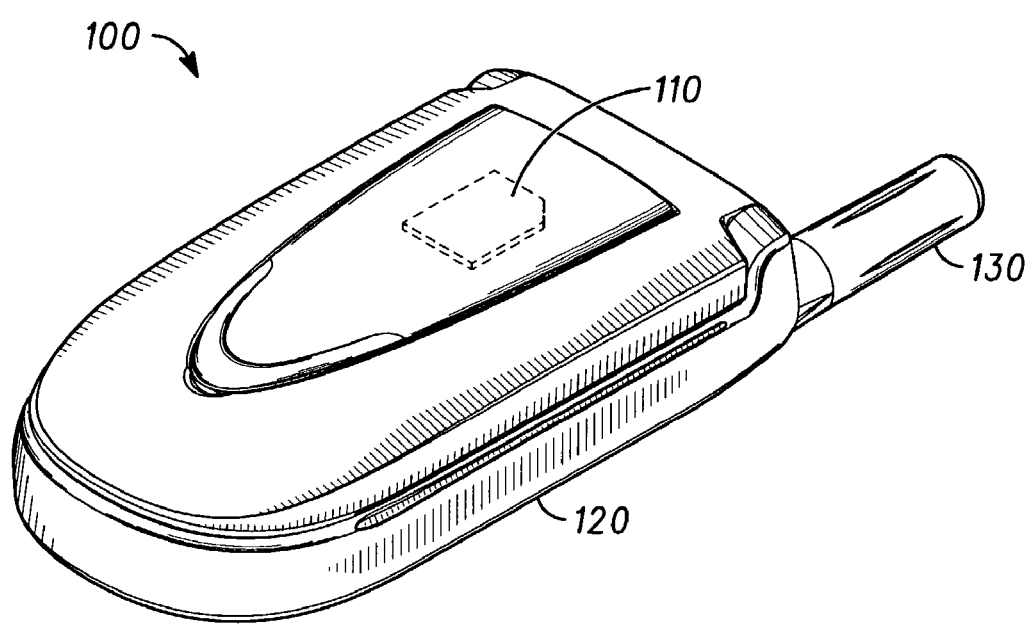
FIG. 1 is an exemplary illustration of a mobile communication device according to a first embodiment.

FIG. 1 is an exemplary illustration of a mobile communication device 100 according to a preferred embodiment. The mobile communication device 100 may be a wireless telephone, a cellular telephone, a personal digital assistant, a portable computer, a pager, or any other device that is capable of sending and receiving data. Preferably, the mobile communication device 100 is a portable telephone. The mobile communication device can include a mobile communication device frame 120, an identity module 110 coupled to the frame, and an antenna 130. The mobile communication device frame may include a flip housing, a candy bar housing, or any other housing or frame for a mobile communication device.

The identity module 110 may be a subscriber identity module, removable user identity module, a card including user information such as subscriber information, or any other device useful for storing information in a mobile communication device. The identity module 110 can include a secure intelligent file system that stores information relevant to a user of the mobile communication device 100. This information can include user information such as identification information, validity codes for authentication purposes, phonebooks, datebooks, preferred networks, system identifications, network identifications, and any other useful user information. The information can further include a subscriber identity such as an international mobile subscriber identity or other subscriber identity information. The subscriber identity can include information regarding a user's home network and information regarding user identification. This subscriber identity information can uniquely identify the user and can uniquely identify the user's home network. For example, the subscriber identity can include home public land mobile network information indicating the user's home network.

Figure 2:
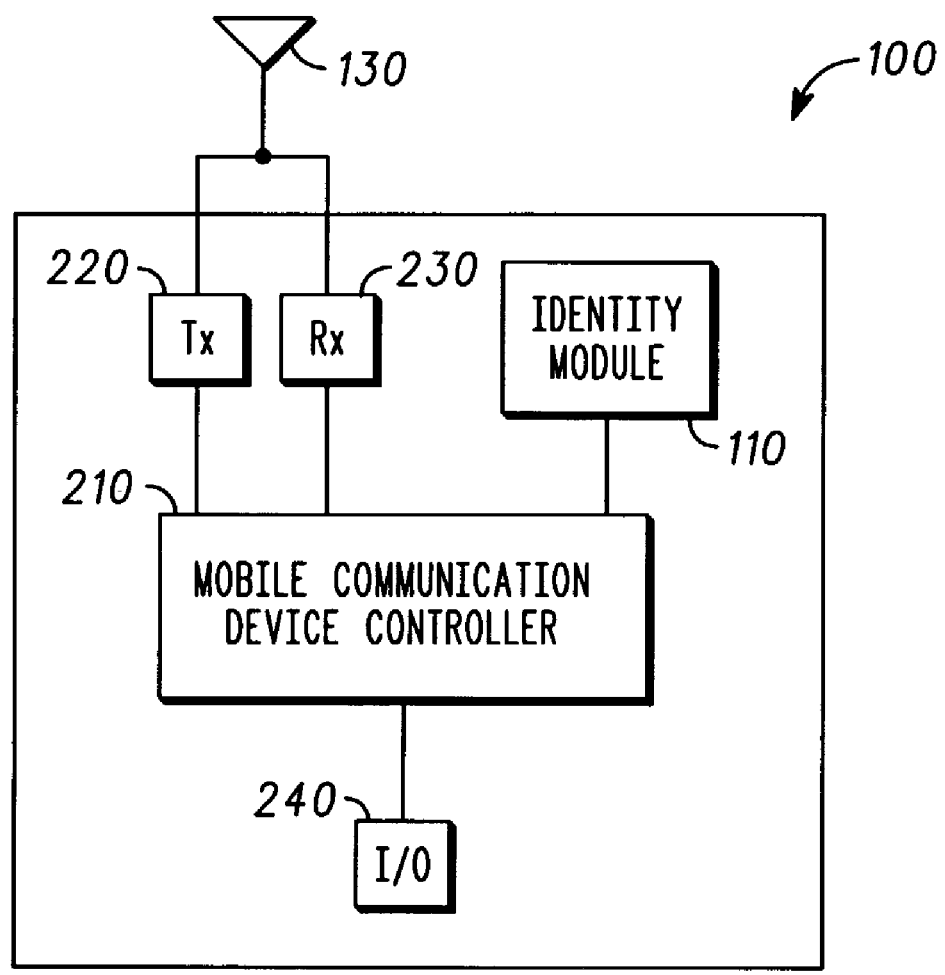
FIG. 2 is an exemplary block diagram of the mobile communication device according to another embodiment.

FIG. 2 is an exemplary block diagram of the mobile communication device 100 according to another embodiment. The mobile communication device 100 can include a mobile communication device controller 210, a transmitter 220, a receiver 230, and input and output components 240. The input and output components 240 can include a display, a keyboard, a microphone, a speaker, or any other components useful for inputting and outputting information in a mobile communication device.

In operation, the mobile communication device controller 210 controls the operation of the components of the mobile communication device 100. The transmitter 220 transmits signals from the mobile communication device 100 and the receiver 230 receives signals sent to the mobile communication device 100. The input and output components 240 provide for the input and output of data and communications in the mobile communication device 100.

According to a preferred embodiment the mobile communication device controller 210 can operate by entering a blocked mode of the mobile communication device 100 and/or the subscriber identity module 110. For example, the blocked mode may be entered after a predetermined number of failed attempts at entering an access code. When the subscriber identity module 110 is blocked, the subscriber identity module 110 can block access to user information and allow access to subscriber identification information for an emergency service communication. For example, when a subscriber needs to call a home service center to obtain an unblock code. The mobile communication device controller 210 can then access the subscriber identification information on a blocked subscriber identity module 110. The mobile communication device controller 210 can then transmit an initial access including a random access burst on a random access channel. The mobile communication device controller 210 can then send an emergency service access call identifier identifying an emergency service communication request to a home service center. The mobile communication device 100 does not need to be registered on the mobile communication network to engage in an emergency service communication. The mobile communication device controller 210 can then transmit an initial access on an access channel. The initial access can be an access probe, a random access burst, or the like. The emergency service call identifier can be sent in the random access burst on the random access channel. The random access burst can include an emergency service communication request type on the random access channel. The emergency service call identifier can also be sent when sending call setup information. For example, the emergency service call identifier can be sent when sending identification information and call type information to a network. For example, the identity of the mobile communication device does not have to be verified and the mobile communication device does not have to be designated as valid for service to place an emergency service communication. The mobile communication device controller 210 can then transmit the mobile communication subscriber identification information. The mobile communication subscriber identification information can include a subscriber identity. The mobile communication device controller 210 can then display call information including an unblock code on the mobile communication device while the in the blocked mode. The mobile communication device controller 210 can alternately audibly output the unblock code. Furthermore, the mobile communication device controller 210 can automatically enter the unblock code to unblock the identity module 110.

Figure 3:
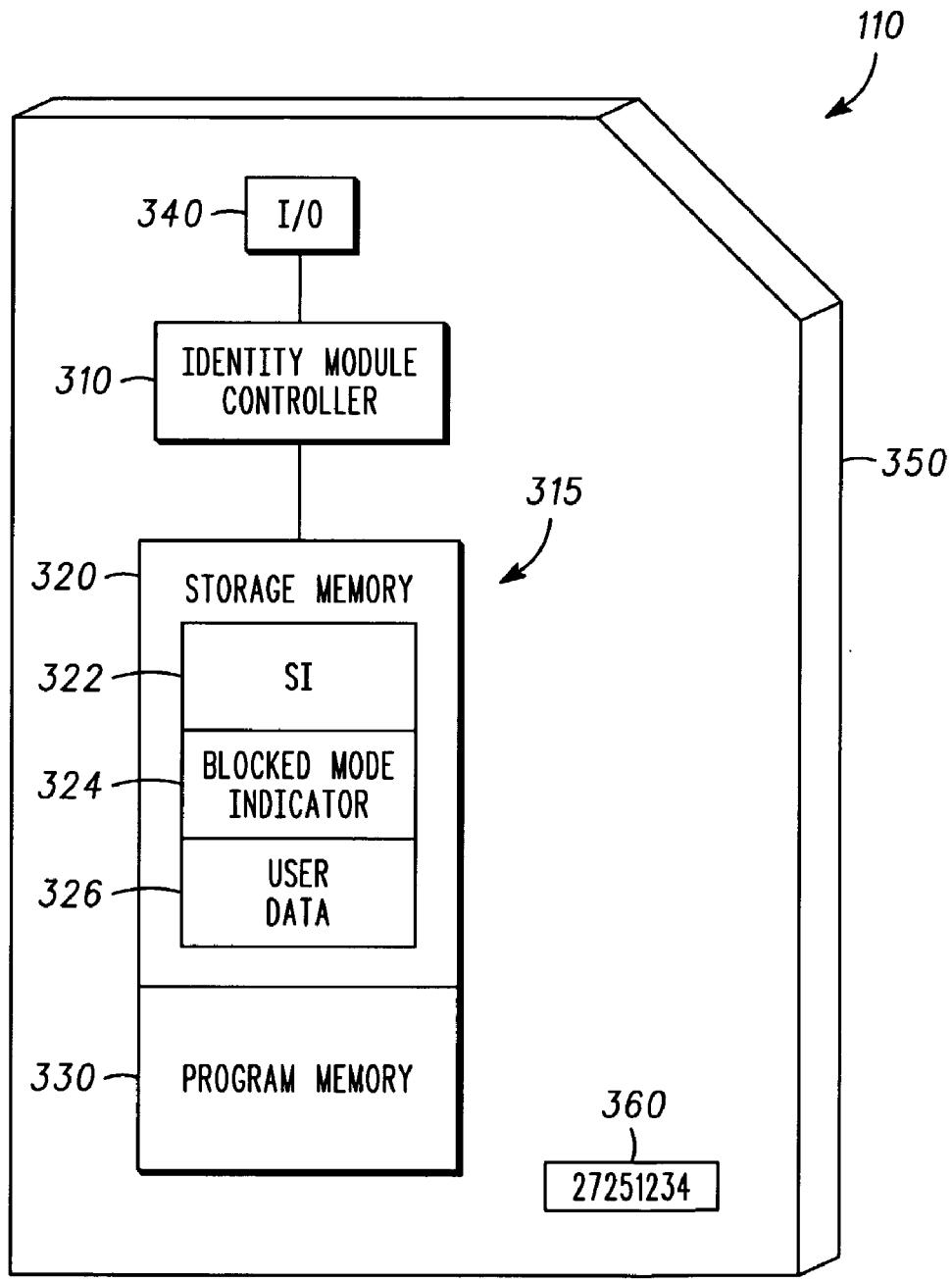
FIG. 3 is an exemplary block diagram of an identity module according to a preferred embodiment.

FIG. 3 is an exemplary block diagram of an identity module 110 according to a preferred embodiment. The identity module 110 can include an identity module controller 310, a memory 315 including a storage memory 320 and a program memory 330, input and output circuitry 340, and a frame 350. The identity module 110 can also include an individual account identifier 360 displayed on the frame 350. The individual account identifier 360 can display a subscriber identity. The storage memory 320 can include a subscriber identity 322, a blocked mode indicator 324, and user data 326. The blocked mode indicator 324 may be a register or any other useful information for indicating a blocked mode of the identity module 110 or the mobile communication device 100. The memory 315 may comprise a random access memory, a read only memory, programmable logic circuitry, or any other circuitry or elements useful for storing data.

In operation, the identity module controller 310 can control the operations of the identity module 110. For example, the identity module controller 310 can control access to data located in the memory 315. The input and output circuitry 340 can communicate with the circuitry of the mobile communication device 100. For example the mobile communication device controller 210 can communicate with the identity module controller 310 via the input and output circuitry 340. The memory 315 can store data and commands of the identity module 110. As indicated above, the storage memory 320 can store a subscriber identity 322, a blocked mode indicator 324, and user data 326. The user data 326 can include identification information, validity codes for authentication purposes, phonebooks, datebooks, preferred networks, system identifications, network identifications, and any other useful user information. The program memory can store commands used by the identity module controller 310 to control the operations of the identity module 110.

According to one embodiment, the memory 315 is a secure storage memory. In particular, the memory 315 is secure because the identity module controller 310 controls access to the memory 315. For example, the identity module controller 310 can require a password to enable the identity module 110 and allow access to the memory 315. The memory 315 can include the subscriber identity 322 such as a mobile communication device subscriber identity and the user data 326 such as user information. The identity module controller 310 can be coupled to the secure storage memory 315 and the frame 350. The identity module controller can block access to the user information 326 but grant access to the mobile communication device subscriber identity 322 when the identity module 110 enters a blocked mode. When in the blocked mode, the identity module controller 310 or the mobile communication device controller 210 may grant the access to the mobile communication device subscriber identity 322 only in response to a request for a service access communication or another designated request.

For example, the identity module 110 can become blocked when a specific number of failed attempts are made to enter a password. Thus, the identity module controller 310 can block access to the memory 315. However, the identity module controller 310 or the mobile communication device controller 210 may allow access to the mobile communication device subscriber identity 322 if the user attempts a service access communication. The blocked mode indicator 324 can have a blocked mode status and an unblocked mode status. Thus, the blocked mode indicator 324 can indicate when the identity module 110 is blocked or unblocked. The identity module controller 310 can thus be configured to grant access to the mobile communication device subscriber identity 322 when the blocked mode indicator 324 is in a blocked mode status and thus indicates the identity module 110 is in a blocked mode. Alternatively, if necessary, a user can manually enter the subscriber identity via the input and output components 240, for example, when the identity module 110 is not present or does not support access to the subscriber identity while blocked. Also, the identity module controller 310 can switch the identity module 110 to an unblocked mode upon receipt of an unblock code from the user. For example, the user can enter an unblock code through the input and output components 240. The mobile communication device subscriber identity 322 can be an international mobile subscriber identity. The program memory 330 can include an identity module code. The identity module controller 310 can execute the identity module code for operation of the identity module 110.

For example, when the identity module 110 enters a blocked mode, the user can be informed of the blocked mode via a display in the input and output components 240. The user can also be informed of a specific key sequence that can be entered to make an emergency service access communication. This service access communication is different from an emergency call, such as a 911 call, in that the communication can put the user in contact with the user's home service center such as a service provider. The home service center may then request personal information from the user to validate the user. Such information may include the user's social security number, the user's mother's maiden name, or any other personal information. Upon validation, the home service center can then provide an unblock code to the user to allow the user to unblock the identity module 110.

Figure 4:
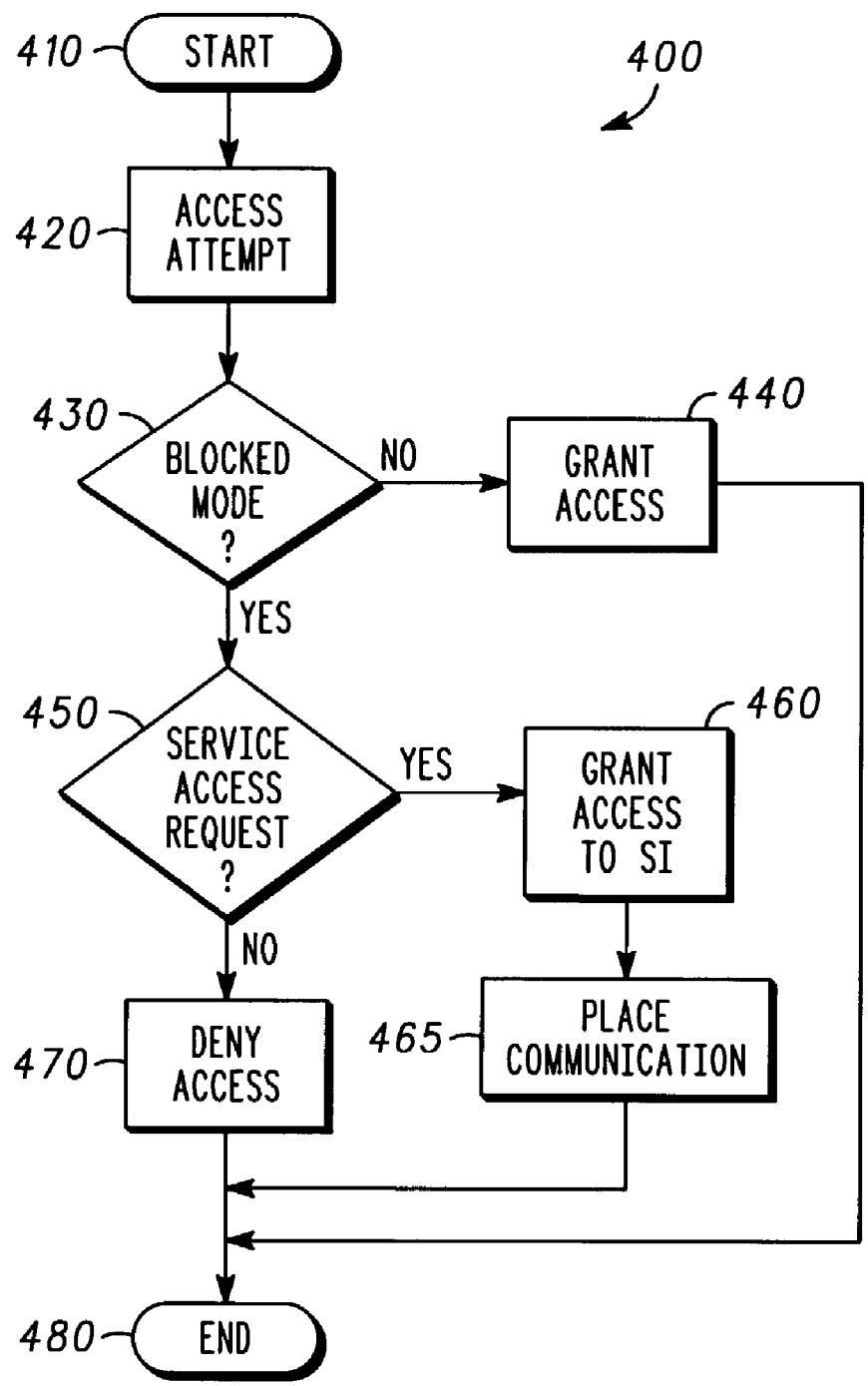
FIG. 4 is an exemplary flowchart outlining the operation of the identity module according to a preferred embodiment.

FIG. 4 is an exemplary flowchart 400 outlining the operation of the identity module 110 according to a preferred embodiment. Steps of the flowchart 400 may be performed either in the mobile communication device controller 210 or in the identity module controller 310. In step 410, the flowchart begins. In step 420 an access attempt is made to data in the memory 315 of the identity module 110. In step 430, a determination is made if the identity module 110 is in a blocked mode. For example the blocked mode indicator 324 may be checked to determine if the identity module 110 is in a blocked mode. If the identity module 110 is not in a blocked mode, access is granted to the data step 440. If the identity module 110 is in a blocked mode, a determination is made if a service access request is being made in step 450. If a service access request is being made, access is granted to the subscriber identity in step 460 and a communication is allowed to the user's service provider in step 465. If a service access request is not being made, access is denied in step 470. In step 480, the flowchart ends.

Figure 5:
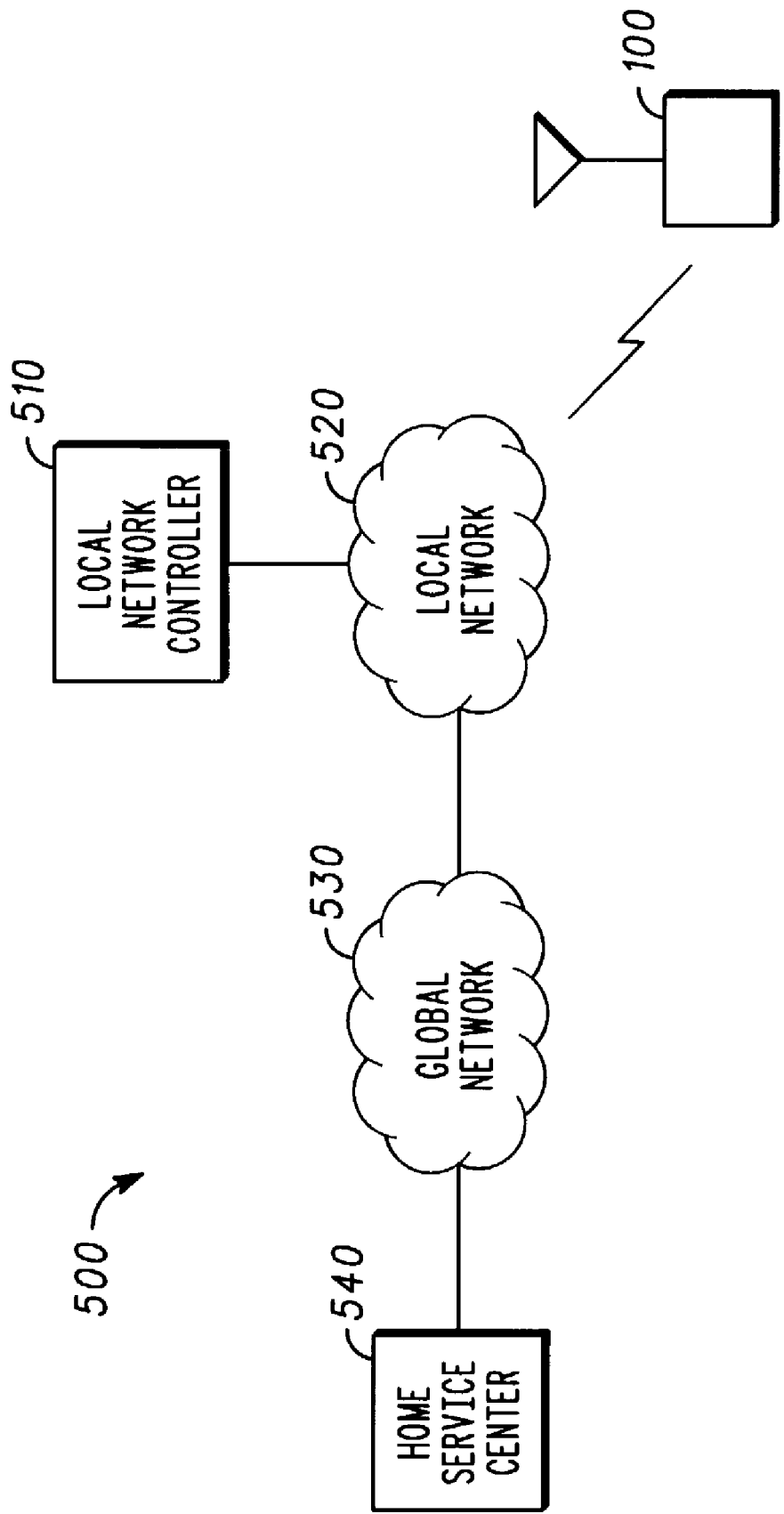
FIG. 5 is an exemplary block diagram of a system for mobile communication according to one embodiment.

According to another embodiment, a blocked mode may be entered for the identity module 110 if a predetermined amount of failed attempts are made at entering a password or access code since the last correct access code. This access code may be a personal identification number, card holder verification information, or the like. The blocked mode may block access to access code entry and thus, access to information in the identity module 110. When an access request is received, a determination is made of whether the identity module 110 is in a blocked mode. If the identity module 110 is in a blocked mode, the access is denied if the access request is for user data 326. If the access request is a service access request as indicated by a specific key sequence on the keypad of the input and output components 240, access is granted to the subscriber identity 322. This subscriber identity 322 may be an international mobile subscriber identity. A service access communication is then placed to the user's home service provider. The service access communication may be identified as such by indicating the communication type in a transmission on a random access channel, during call setup, or otherwise. The user's home service provider can then provide an unblocking code such as a value to unblock the access code, a personal identification number unblocking key, or any other code. This unblocking code may be provided audibly to the user, visually to the user, or directly to the identity module 110. For example, a short messaging service message including the unblocking code may be sent to the mobile communication device 100. The identity module 110 can then be unblocked using the unblocking code:

FIG. 5 is an exemplary block diagram of a system 500 for mobile communication according to one embodiment. The system 500 includes a local area network controller 510, a local network 520, a global network 530, and a home service center 540. The local network controller 510 controls the operations and access to the local network 520. The home service center 540 is the home service center for the mobile communication device 100. For example, the home service center 540 provides home access and also provides services for the mobile communication device 100. These services can include repair services, access services, communication services, or any other services for a subscriber to a mobile communication device network. The local network 520 may be any network providing for mobile communication device communications. The local network 520 is local to the mobile communication device 100. However, the local network is not necessarily local to the home service center 540.

The global network 530 may include a mobile communication network, a public land mobile network, or any other communication network. For example, the network 530 may include any type of network that is capable of sending and receiving communication signals. For example, the global network 530 may include a data network, such as the Internet, an Intranet, a local area network (LAN), a wide area network (WAN), a cable network, and other like communication systems. The global network 530 may also include a telecommunications network, such as a local telephone network, long distance telephone network, cellular telephone network, satellite communications network, cable television network and other like communications systems. Furthermore, the global network 530 may include more than one network and may include a plurality of different types of networks. Thus, the global network 530 may include a plurality of data networks, a plurality of telecommunications networks, a combination of data and telecommunications networks and other like communication systems. Additionally, the global network 530 may be any means of communication between a network, such as the local network 520, remote from the home service center 540 and the home service center 540.

In operation, a mobile communication device 100 may be roaming or not be registered on the local network 520. If the mobile communication device 100 requires service, the mobile communication device 100 may make an emergency service communication request to the local network controller 510. For example, the mobile communication device 100 may be in a blocked mode. Thus, the mobile communication device 100 cannot register on the local network 520. However, the mobile communication device 100 is allowed to make the emergency service request and send a subscriber identity to obtain assistance from the home service center 540 to unblock the mobile communication device 100.

According to a preferred embodiment, the local network controller 510 receives an emergency service call identifier from an unregistered mobile communication device 100 on the local network 520, the mobile communication device 100 being in a blocked mode. The local network controller 510 can also receive a subscriber identity 322 from the mobile communication device 100. The emergency service call identifier identifies an emergency service request to a home service center 540. The local network controller 510 routes the emergency service request and the subscriber identity 322 to the home service center 540. The home service center 540 can then send an unblock code upon verification of the subscriber's identity. The local network controller 510 then forwards the unblock code to the mobile communication device 100.

Figure 6:
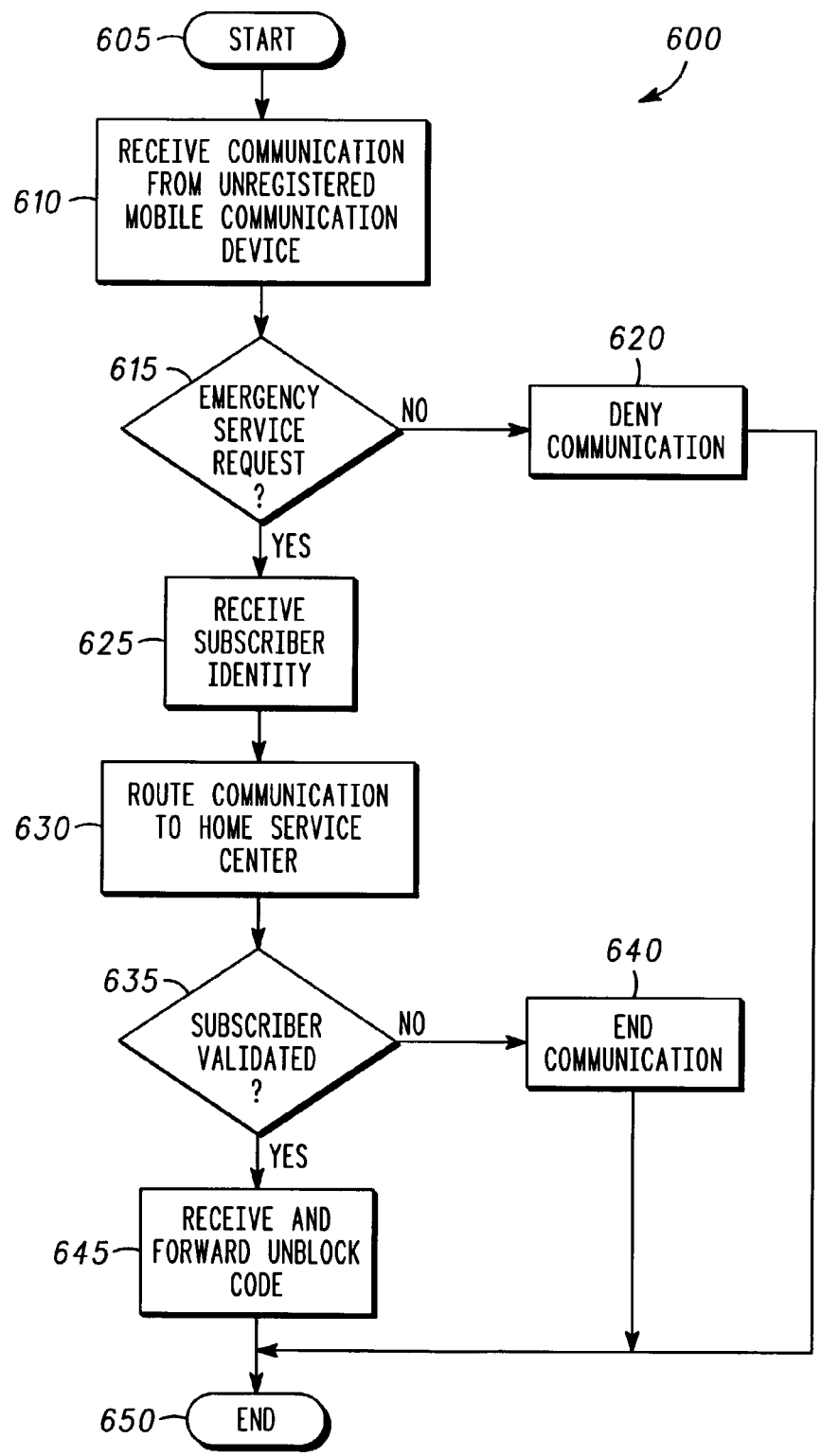
FIG. 6 is an exemplary flowchart outlining the operation of the local network controller according to a preferred embodiment.

FIG. 6 is an exemplary flowchart 600 outlining the operation of the local network controller 510 according to a preferred embodiment. In step 605, the flowchart begins. In step 610, the local network controller 510 receives a communication from an unregistered mobile communication device 100. In step 615, the local network controller 510 determines if the communication is an emergency service request. If the communication is not an emergency service request (and it is not an emergency call, such as a 911 call) the local network controller 510 denies the communication in step 620. If the communication is an emergency service request, in step 625, the local network controller 510 receives the subscriber identity 322 from the mobile communication device 100. In step 630, the local network controller 510 routes the communication to the home service center 540. In step 635, the local network controller 510 determines if the subscriber is validated. For example, if the home service center 540 sends validation information within a predetermined time. If the subscriber is not validated, the local network controller 510 ends the communication in step 640. If the subscriber is validated, in step 645 the local network controller 510 receives and forwards an unblock code to the mobile communication device 100. In step 650, the flowchart ends.

According to another embodiment, the local network controller 510 receives an emergency service call identifier from an unregistered mobile communication device 100, the emergency service call identifier identifying an emergency service request to a home service center 540. The emergency service call identifier can include a subscriber identification 322. The emergency service call identifier can be received during a call type setup. Also, the emergency service call identifier can be received during a random access request from the mobile communication device on a random access channel. The emergency service call identifier can include a subscriber identification and a random access channel emergency service call type. The local network controller 510 can then route the emergency service request to the home service center 540. Upon validation, the local network controller 510 can receive and forward a short message service message to the mobile communication device 100 including an unblock code.

The method of this invention is preferably implemented on a programmed processor. However, mobile communication device controller 210, the identity module controller 310, and/or the local network controller 510 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A method of operating an identity module in a mobile communication device comprising:
   receiving an access request;
   determining a blocked mode of the identity module;
   granting the access request if the identity module is not in a blocked mode and the request is for a subscriber identity;
   denying the access request if the identity module is in a blocked mode and the request is for user information; and
   granting the access request if the identity module is in a blocked mode and the request is for the same subscriber identity.

2. The method according to claim 1, wherein the granting the access request if the identity module is in a blocked mode step further comprises:
   granting the request if the identity module is in a blocked mode and the request is for a subscriber identity for a service access communication.

3. The method according to claim 2, further comprising placing a service access communication to a home service provider.

4. The method according to claim 1, further comprising entering a blocked mode of the identity module;
   receiving a specific key sequence;
   determining if the specific key sequence is for a service access communication; and
   wherein the granting the access request if the identity module is in a blocked mode step further comprises granting the request if the identity module is in a blocked mode and the request is for a subscriber identity for a service access communication.

5. The method according to claim 1, further comprising:
   receiving an incorrect access code;
   determining the number of incorrect access codes received since the last correct access code; and
   entering a blocked mode of the identity module if the number of incorrect access codes since the last access code is more than a predetermined amount.

6. The method according to claim 1, wherein the subscriber identity is an international mobile subscriber identity.

7. The method according to claim 1, further comprising:
   receiving an unblocking code; and
   entering an unblocked mode of the identity module in response to the unblocking code.

8. The method according to claim 1, further comprising transmitting a service access request on a random access channel.

* * * * *